United States Patent
Prathapan et al.

(10) Patent No.: US 11,170,071 B2
(45) Date of Patent: Nov. 9, 2021

(54) FFT ENGINE HAVING COMBINED BIT-REVERSAL AND MEMORY TRANSPOSE OPERATIONS

(71) Applicant: TEXAS INSTRUMENTS INCORPORATED, Dallas, TX (US)

(72) Inventors: Indu Prathapan, Bengaluru (IN); Sai Ram Prakash Jayanthi, Vizianagaram (IN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 239 days.

(21) Appl. No.: 16/221,470

(22) Filed: Dec. 15, 2018

(65) Prior Publication Data
US 2020/0192968 A1 Jun. 18, 2020

(51) Int. Cl.
*G06F 17/14* (2006.01)
*G06F 7/76* (2006.01)
*G06F 13/28* (2006.01)

(52) U.S. Cl.
CPC ............ *G06F 17/142* (2013.01); *G06F 7/768* (2013.01); *G06F 13/287* (2013.01)

(58) Field of Classification Search
CPC ...... G06F 17/14; G06F 17/141; G06F 17/142; G06F 7/68; G06F 13/287; H03M 13/271
See application file for complete search history.

(56) References Cited

U.S. PATENT DOCUMENTS

| | | | | |
|---|---|---|---|---|
| 6,122,703 | A * | 9/2000 | Nasserbakht | G06F 17/142 708/404 |
| 2004/0001557 | A1* | 1/2004 | Sunwoo | H04L 27/2628 375/295 |
| 2006/0253514 | A1* | 11/2006 | Yu | G06F 17/142 708/404 |
| 2011/0099216 | A1* | 4/2011 | Sun | G06F 17/142 708/404 |
| 2018/0336161 | A1* | 11/2018 | Sheikh | H04L 27/263 |

* cited by examiner

*Primary Examiner* — Emily E Larocque
(74) *Attorney, Agent, or Firm* — Ebby Abraham; Charles A. Brill; Frank D. Cimino

(57) ABSTRACT

A data processing device includes: 1) Fast Fourier Transform (FFT) logic configured to generate FFT output samples for each of a plurality of digital input signals; 3) a first memory device with a plurality of banks; 4) a second memory device; 5) a bit-reversed address generator and first set of circular shift components configured to shift between the plurality of banks when writing the generated FFT output samples in bit-reversed address order to the first memory device; and 6) a second set of circular shift components configured to shift between the plurality of banks when reading FFT output samples in linear address order from the first memory device for storage in the second memory device, wherein the first and second set of circular shift components together are configured to read FFT output samples in transpose order using combined bit-reversal and memory transpose operations.

23 Claims, 11 Drawing Sheets

FFT ENGINE HAVING COMBINED BIT-REVERSAL AND MEMORY TRANSPOSE OPERATIONS

BACKGROUND

Spectral analysis of electrical sense signals is useful in many scenarios. An example scenario involves spectral analysis of sense signals or of different signals (e.g., a received sense signal versus a target signal) to sense variations in a physical environment. Another example scenario involves spectral analysis of image signals. Radar systems are one example of system that relies on spectral analysis of sense signals. One example technique to perform spectral analysis analyze characteristics of the object(s) of sense signals involves performing Fast Fourier Transform (FFT) operations on the received signal, where the FFT operations generate output samples as a function of frequency.

Multi-dimensional Fast Fourier transforms are generally computed by taking one-dimensional D) Fast Fourier transforms along all dimensions, successively. As an example, by analyzing the FFT output samples over multiple dimensions, a Frequency-Modulated Continuous Wave (FMCW) radar system can detect the characteristics of an object related to the radar system. For example, three-dimensional (3D) FFT processing is used to determine an object's distance from the radar system, an object's velocity relative to the radar system, and an object's angle relative to the radar system.

SUMMARY

In accordance with at least one example of the disclosure, a data processing device comprises a Fast Fourier Transform (FFT) logic configured to generate FFT output samples for each of a plurality of digital input signals. The data processing device also comprises a first memory device with a plurality of banks. The data processing device also comprises a second memory device. The data processing device also comprises a bit-reversed address generator and first set of circular shift components configured to shift between the plurality of banks when writing the generated FFT output samples in bit-reversed address order to the first memory device. The data processing device also comprises a second set of circular shift components configured to shift between the plurality of banks when reading FFT output samples in linear address order from the first memory device for storage in the second memory device, wherein the first and second set of circular shift components together are configured to read FFT output samples in transpose order, using combined bit-reversal and memory transpose operations.

In accordance with at least one example of the disclosure, an integrated circuit comprises FFT logic configured to generate K FFT output samples at a time and N total FFT output samples for each of the plurality of digitized sense signals, wherein N is a multiple of K, and wherein K is an integer equal to at least 2. The integrated circuit also comprises a bit-reversed address generator and a first set of circular shift components configured to provide shifts when writing the N FFT output samples in bit-revered address order in a first memory device with K banks. The FFT also comprises a second set of circular shift components configured to perform shifts when reading the N FFT output samples in linear address order from the first storage device for storage in a second storage device. The first and second set of circular shift components together are configured to read FFT output samples in transpose order using combined bit-reversal and memory transpose operations.

In accordance with at least one example of the disclosure, a method comprises performing parallel pipeline Fast Fourier Transform (FFT) operations to generate FFT output samples. The method also comprises performing writing operations to write FFT output samples to a first memory device, wherein the writing operations involve shifting between different banks of the first memory device and writing the FFT output samples in bit-reversed address order. The method also comprises performing reading operations to read FFT output samples from the first memory, wherein the reading operations involve shifting between different banks of the first memory device and reading FFT output samples in linear address order for storage of transposed FFT output samples in a second memory device, wherein at least some of the writing operations and at least some of the reading operations overlap.

In accordance with at least one example of the disclosure, a radar data processing device comprises: 1) at least one analog-to-digital converter (ADC) configured to digitize a plurality of input signals, wherein each input signal includes radar chirp and radar chirp reflection information; 2) FFT logic configured to generate FFT output samples for each digitized input signal; 3) a first memory device with a plurality of banks; 4) a second memory device; 5) a first set of circular shift components configured to perform bit-reversal operations and to shift between the plurality of banks when writing the generated FFT output samples corresponding to a plurality of the digitized input signals to the first memory device; and 6) a second set of circular shift components configured to perform memory transpose operations and to shift between the plurality of banks when reading FFT output samples corresponding to the plurality of digitized input signals from the first memory device for storage in the second memory device, wherein at least some of the bit-reversal operations and at least some of the memory transpose operations are performed in parallel.

BRIEF DESCRIPTION OF THE DRAWINGS

For a detailed description of various examples, reference will now be made to the accompanying drawings in which.

DETAILED DESCRIPTION

Disclosed herein are data processor devices, systems, and methods, involving a Fast Fourier Transform (FFT) engine topology with combined bit-reversal and memory transpose operations. As used herein "combined" bit-reversal and memory transpose operations" refers to performing FFT output sample transpose operations and performing FFT output sample bit-reversed ordering operations to store FFT output samples in data memory without incurring extra latency for a separate transpose operation. By using an FFT engine topology that performs at least some combined bit-reversal and memory transpose operations, data processing latency and the FFT engine footprint (integrated circuit area) is reduced compared to other FFT engine topologies, where FFT output samples are stored or used in a transposed order. Without limitation to other examples, the disclosed FFT engine topologies are relevant to multi-dimensional FFT analysis, where the efficiency of transpose operations affects each dimension.

Figure 1:
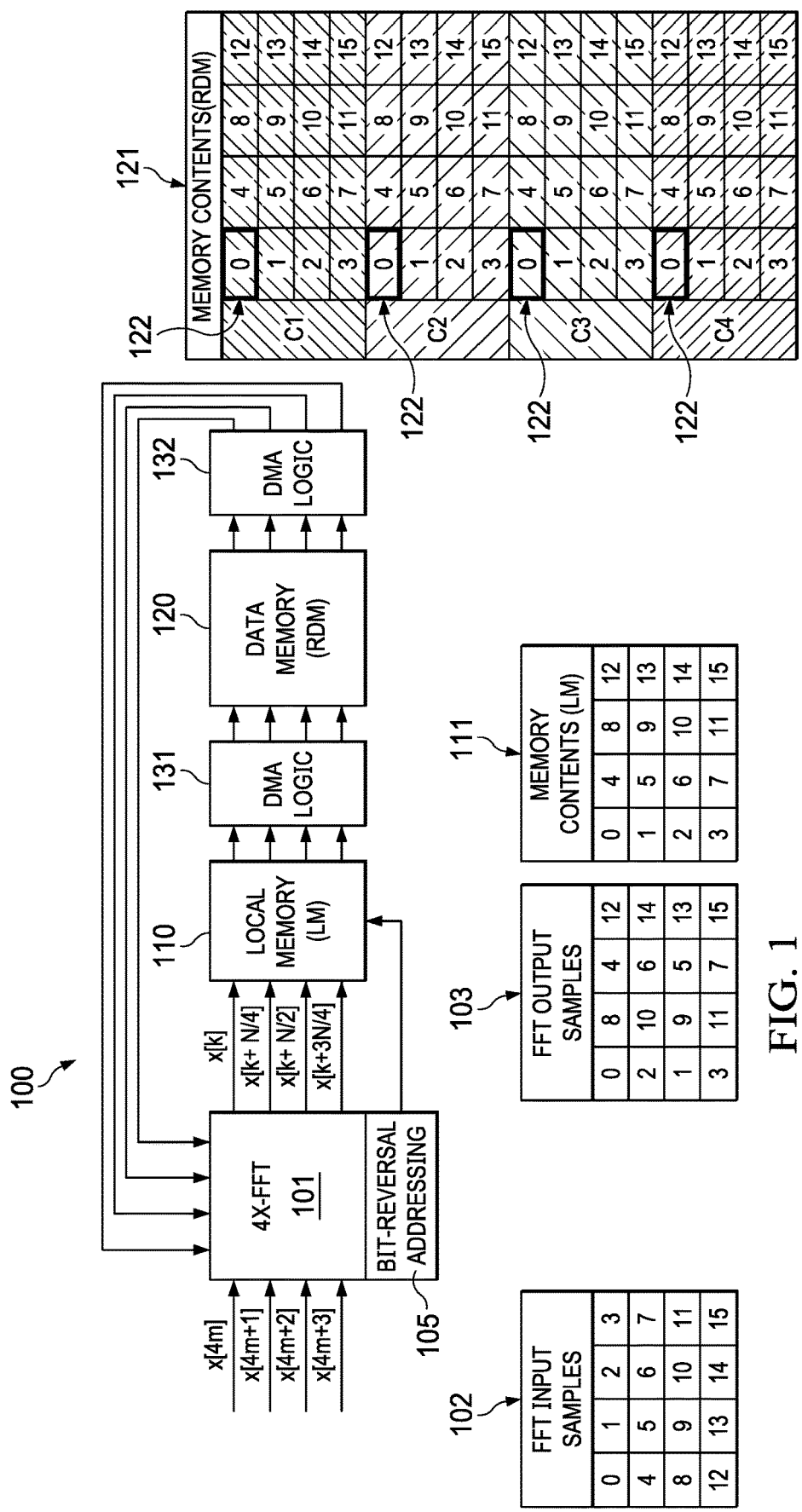
FIG. 1 is a block diagram showing a prior art Fast Fourier Transform (FFT) engine for a system implementing multi-dimensional FFT.

FIG. 1 shows a block diagram of an example FFT engine 100 that can be used for multi-dimensional FFT analysis (e.g., for radar data processing or other sense signal analysis). For the FFT engine 100, a 4X-FFT 101 is used. As used herein, a "KX-FFT" refers to a parallel pipelined FFT architecture to achieve K times parallelism by processing K inputs and outputting K outputs at a time. If K=4, the FFT is a 4X-FFT such as the 4X-FFT 101. In some real-time applications, where high throughput is desired, several samples of an input sequence are processed in parallel and multiple outputs are provided in parallel. In the example 4X-FFT 101, the FFT output samples X[k], X[k+N/4], X[k+N/2], X[k+3N/4] are generated from FFT input samples x[4m], x[4m+1], x[4m+2], x[4m+3], where k=0, 1, . . . , N–1, where m=0, 1, . . . , N–1, and where N is the size of the FFT. In the example of FIG. 1, an FFT of size N=16 is considered, where FFT input samples are input four at a time (samples 0, 1, 2, 3, then samples 4, 5, 6, 7, and so on) to the 4X-FFT 101 as represented in table 102, and where the FFT output samples are output four at a time from the 4X-FFT 101 and are bit-reversed as represented in table 103 (samples 0, 8, 4, 12, then samples 2, 10, 6, 12, and so on).

The FFT output samples are stored in local memory 110 with a multi-row-multi-column format as represented in table 111 using bit-reversed addressing 105, which uses knowledge of the bit-reversal behavior of the 4X-FFT 101 to write the output samples from the 4X-FFT 101 in the multi-row-multi-column format of table 111. The contents of the local memory 110 are stored in a data memory 120 with the format represented in table 121 using a direct memory access (DMA) logic 131, where the same multi-row-multi-column format is used for each set of FFT output samples. The contents of the data memory are again read out in transposed order to perform a second dimensional FFT. The transpose read operation for 4 data samples consumes 4 clock cycles since they reside in different memory locations, thus reducing the effective throughput and speed of the 4X FFT engine 100. The local memory 110 may be smaller in size than the data memory 120. In some scenarios, the local memory 110 will be used to store one 1D-FFT outputs whereas the data memory 120 is used to store the outputs of multiple 1D-FFT outputs across multiple dimensions. The operations described for the FFT engine 100 of FIG. 1 are part of a larger data processing chain, where large data processing latency introduced for transpose operations of the FFT engine 100 are undesirable.

Figure 2:
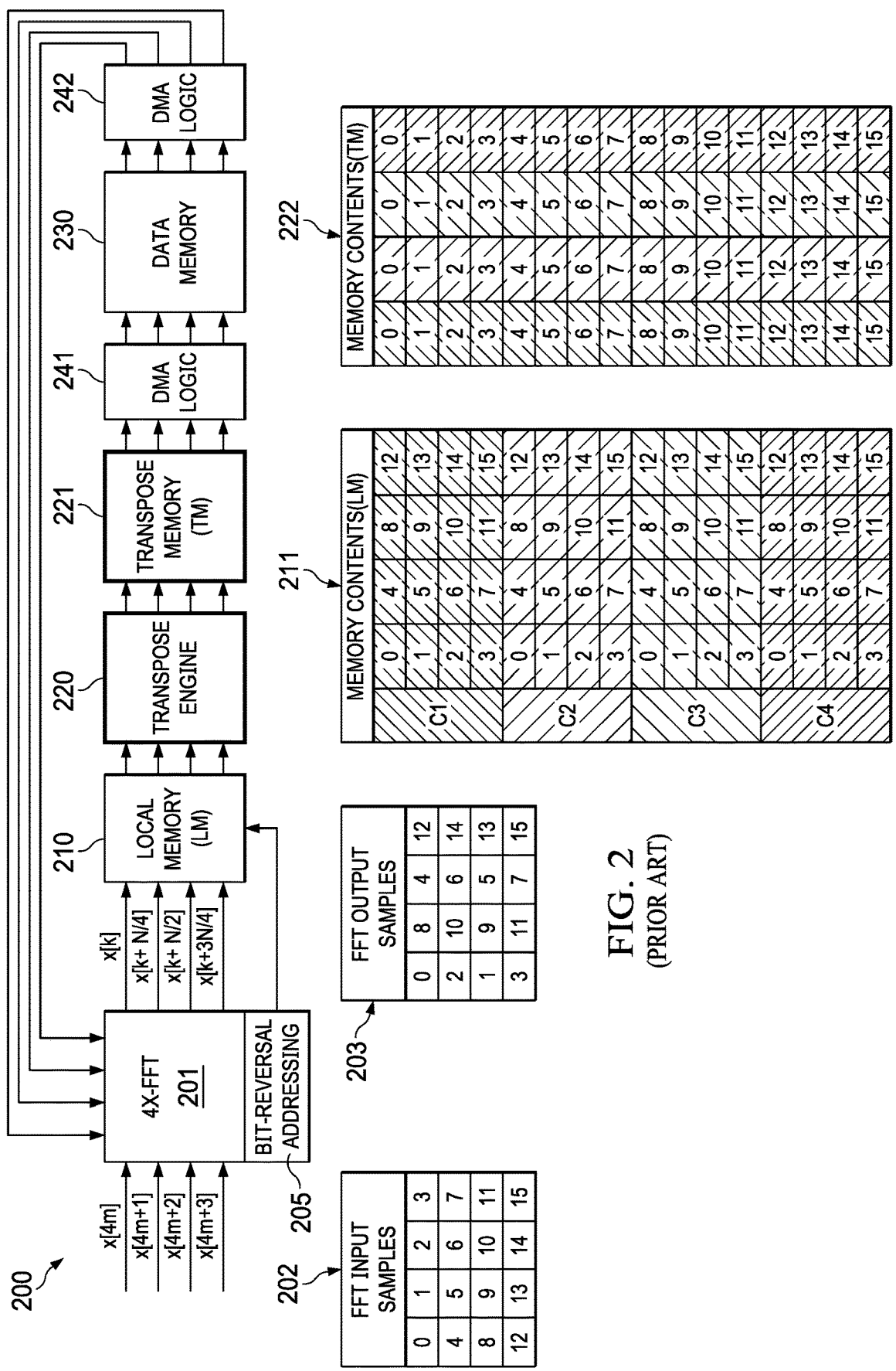
FIG. 2 is a block diagram showing another prior art FFT engine for a system implementing multi-dimensional FFT.

FIG. 2 shows a block diagram of another FFT engine 200 that can be used for performing multi-dimensional FFTs (e.g., for radar data processing or other sense signal analysis). For the FFT engine 200, a 4X-FFT 201 is used, where FFT output samples X[k], X[k+N/4], X[k+2N/4], X[k+3N/4] are generated from FFT input samples x[4m], x[4m+1], x[4m+2], x[4m+3]. In the example of FIG. 1, an FFT of size N=16 is considered, where FFT input samples that are input four at a time (samples 0, 1, 2, 3, then samples 4, 5, 6, 7, and so on) to the 4X-FFT 201 as represented in table 202, and where the FFT output samples are output four at a time from the 4X-FFT 201 in bit-reversed address order as represented in table 203 (samples 0, 8, 4, 12, then samples 2, 10, 6, 12, and so on). The FFT output samples for multiple FFTs are stored in local memory 210 with a multi-row-multi-column format as represented in table 211 using bit-reversal addressing 205, which uses knowledge of the bit-reversal behavior of the 4X-FFT 201 to provide the multi-row-multi-column format. The FFT engine 200 also includes a transpose engine 220 and a transpose memory 221, where the transpose memory 221 stores samples obtained from the local memory 210 in a transposed format represented in table 222. The contents of the transpose memory 221 are stored in a larger data memory 230 with the format represented in table 222 using DMA logic 241. The contents of the data memory 230 can be directly used to perform a second dimensional FFT since the data is already stored in a transpose order using transpose engine 220. The local memory 210 may be smaller in size compared to data memory 230. The operations described for the FFT engine 200 of FIG. 2 are part of a larger data processing chain, where data processing latency introduced by transpose operations of the FFT engine 200 is undesirable.

In some examples, an FFT engine that overcomes the latency issues discussed for the FFT engines 100 and 200 includes FFT logic configured to receive a plurality of digitized sense signals sequentially. As an example, each digitized sense signal includes radar chirp and radar chirp reflection information. In other examples, each digitized sense signal includes image information, or other sense signal information. In some examples, the FFT logic generates K FFT output samples at a time and N total FFT output samples for each digitized sense signal, where N is a multiple of K, and where K is an integer equal to at least 2. In one example N is 16, and K is 4. The FFT engine also includes: 1) a first memory device with a plurality of banks (e.g., K banks); and 2) a bit-reversed address generator and first set of circular shift components configured to shift between the plurality of banks when writing the generated FFT output samples in bit-reversed address order to the first memory device. The FFT engine also includes a second set of circular shift components configured to shift between the plurality of banks when reading FFT output samples in linear address order from the first memory device for storage in the second memory device, where the first and second set of circular shift components together are used to read FFT output data in transpose order, and where at least some bit-reversal operations and at least some memory transpose operations are combined In some examples, the disclosed FFT engine is part of a radar data processing device (e.g., an integrated circuit, chip, or multi-die module). An example radar data processing device includes or couples to at least one antenna configured to transmit chirp signals and to receive chirp reflection signals. Each transmitted chirp signal and related chirp reflection signals are combined by the radar data processing device and digitized as an input signal to the FFT engine, to produce FFT output samples stored in the second memory device. A DMA can also be included in the system that can be configured to read data in another dimension from the second memory device to the FFT engine to implement multi-dimensional FFTs where number of dimension is at least equal to 2

The radar data processing device also includes a processor configured to use the multi-dimensional FFT output samples stored in the second memory device to determine object parameters such as at least one of an object range, an object velocity, and an object angle relative to a chirp origin. With the disclosed FFT engine, data processing latency of devices implementing multi-dimensional FFT is improved relative to the data processing devices that use the FFT engines introduced in FIGS. 1 and 2. To provide a better understanding, various FFT engine options, data processing device options and/or other options are described using FIGS. 3-7 as follows.

Figure 3:
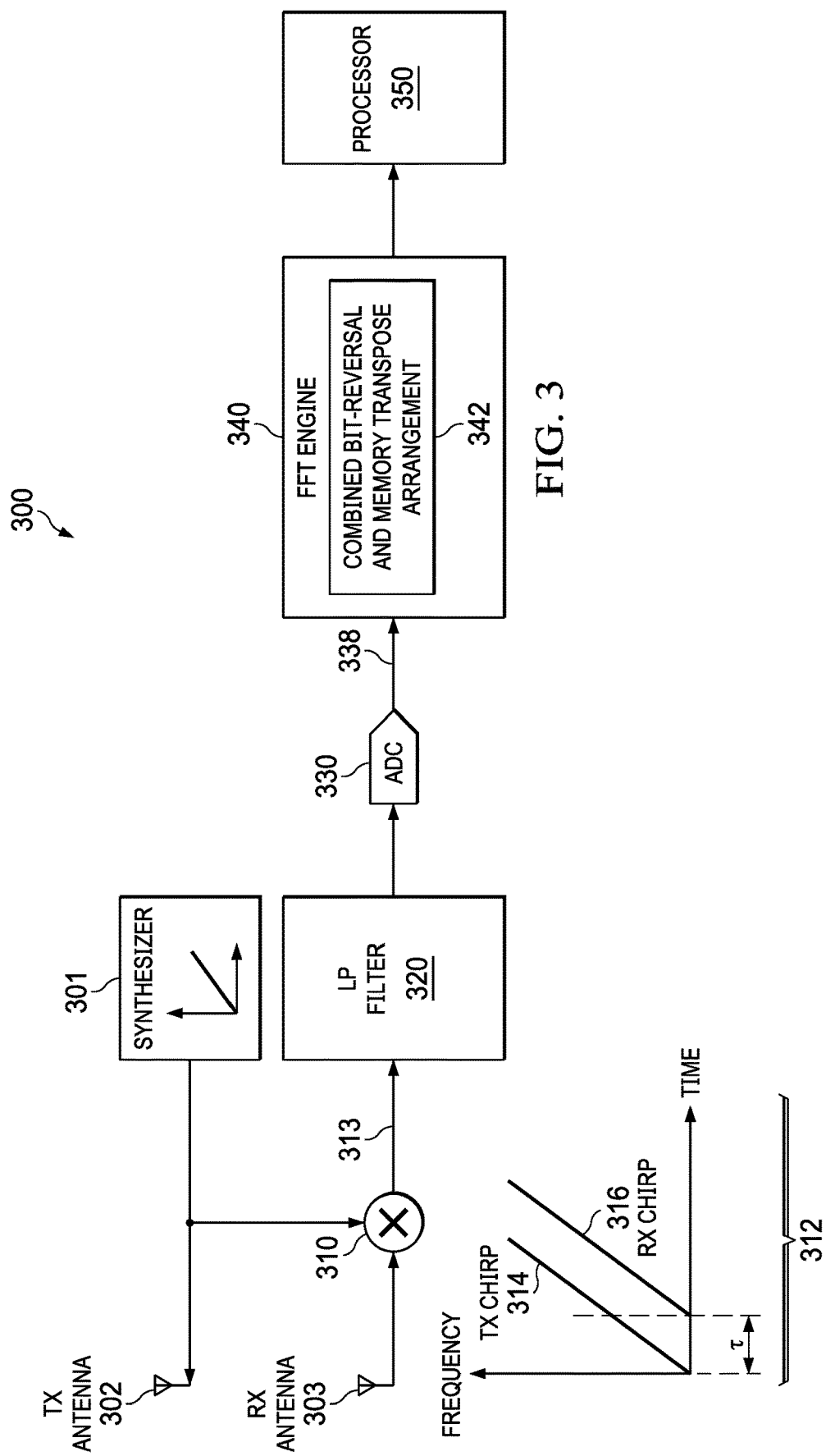
FIG. 3 is a block diagram showing a radar system in accordance with various examples.

FIG. 3 is a block diagram of a radar system 300 in accordance with various examples. In the example of FIG. 3, the radar system 300 includes a synthesizer 301 configured to generate chirps, a TX antenna 302 for transmitting chirps generated by the synthesizer 301, and a RX antenna 303 for receiving chirp reflections in response to transmitted chirps. The radar system 300 also includes a mixer 310 that provides input signals 313 to a low-pass filter 320, where each input signal 313 includes information regarding the chirp 314 and any chirp reflections 316. The graph 312 shows frequency relative to time to illustrate a chirp 314 and a chirp reflection 316 (i.e., the chirp 314 is a signal with increasing frequency as a function of time, and the chirp reflection 316 is a delayed version of the chirp 314). In some examples, the mixer 310 outputs a sinusoid wave with a frequency equal to the difference between the instantaneous frequency of the chirp 314 and the instantaneous frequency of the chirp reflection 316 at time $\tau$ in graph 312. In other words, the phase of the sinusoid wave generated by the mixer 310 is equal to the difference of the phase of the chirp 314 and the phase of the chirp reflection 316.

Each of the input signals 313 is filtered by the low-pass filter 320 and is digitized by an analog-to-digital converter (ADC) 330. The output of the ADC 330 is a digitized sense signal 333, where each digitized sense signal 333 includes chirp and chirp reflection information. Each digitized sense signal 333 is provided to an FFT engine 340 to perform FFT in the first dimension with a combined bit-reversal and memory transpose arrangement 342. FFT engine 340 takes in data in serial order of indices and outputs data in bit-reversed order of indices. In at least some examples, the combined bit-reversal and memory transpose arrangement 342 includes memory devices, DMA and circular shift components to provide bit-reverse address ordered and memory transposed multi-dimensional FFT output samples for use by a processor 350 to determine object parameters for one or more objects that cause chirp reflections 316. Example object parameters include object position, object velocity, and object angle relative to a radar origin (the location of the radar system 300).

Figure 4:
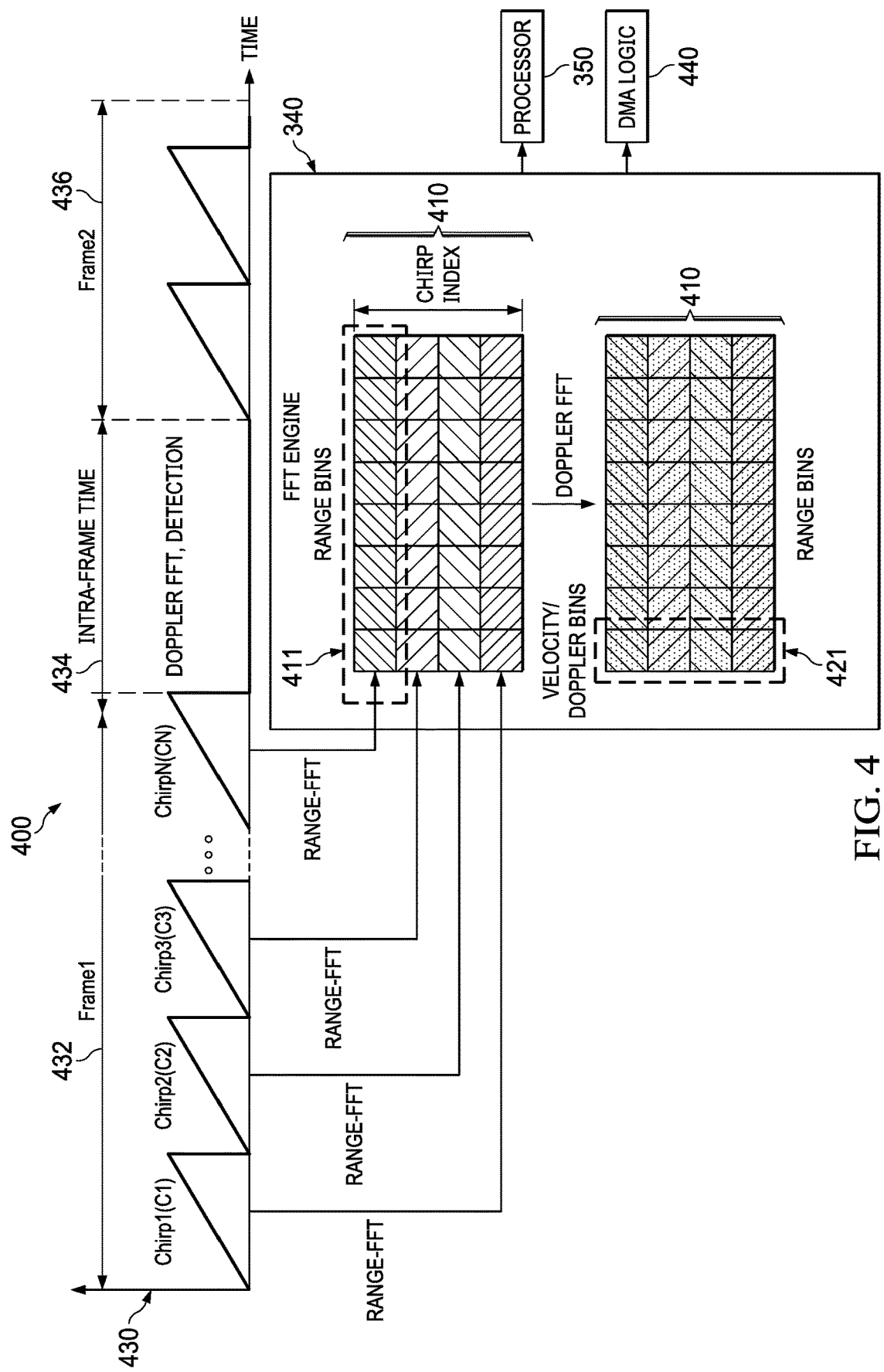
FIG. 4 is a block diagram showing part of a radar data processing system in accordance with various examples.

FIG. 4 is a block diagram showing part of a radar data processing system 400 in accordance with various examples. In the example of FIG. 4, the radar data processing system 400 includes the FFT engine 340 and the processor 350 introduced in FIG. 3. Also represented in FIG. 4 is a graph 430 showing example radar data processing operations related to frame 432 and intra-frame time 434. More specifically, radar data processing operations related to four chirps (C1-C4) of frame 432 are represented, where the radar data processing operations involve obtaining FFT output samples 410 by the FFT engine 340. More specifically, during frame 432, the FFT engine 340 organizes the FFT output samples 410 into range bins 411 indexed by chirp number. These FFT output samples 410 are stored in a radar data memory (referred to a second memory device herein) in a bit-reversed and memory transposed arrangement. The FFT output samples 410 are used to perform a range analysis 411. Example operations for the range analysis 411 involve using at least some of the FFT output samples 410 for individual chirps to determine the range of one or more objects relative to a radar origin.

Thereafter, during the intra-frame time 434, the FFT output samples 410 are used to perform a Doppler analysis 421 by using the FFT engine to perform FFT operation across all Doppler/Velocity bins to perform FFT in the second dimension. A third FFT operation can also be performed across FFT output samples from multiple antennas in the third dimension to determine the object angle relative to the radar origin. As previously noted in the discussion for FIG. 3, the FFT engine 340 includes a combined bit-reversal and memory transpose arrangement 342 (not shown in FIG. 4) to organize the FFT output samples 410 in the radar data memory, where combined bit-reversal and memory transpose operations of the FFT engine 340 reduce radar data processing latency compared to the FFT engines introduced in FIGS. 1 and 2 for multi-dimensional FFTs In accordance with at least some examples, the FFT engine 340 provides the FFT output samples 410 used for range analysis 411, Doppler analysis 421 and angle analysis (not shown in figure) by using the FFT engine three times to perform the FFT operations across the three dimensions. More specifically, the FFT engine 340 performs combined bit-reversal and memory transpose operations to store the FFT output samples 410 in a memory accessible to the processor 350 and DMA logic 440. In some examples, the DMA logic is configured to transfer data from a first memory device to a second memory after the combined bit-reversal and transpose operations. Also, in some examples, the DMA logic is configured to transfer data from a second memory device to the FFT engine 340 to perform multi-dimensional FFT operations.

In some examples, the processor 350 performs range analysis 411, Doppler analysis 421, and angle analysis operations using the final FFT output samples 410. The process of acquiring chirp and chirp reflection information and of performing radar data processing operations continues for each subsequent frame 436 and subsequent intra-frame time (not shown), where each set of chirps and related reflections provides updated information from which to determine updated object parameters such as object position, object velocity, and object angle relative to a radar origin.

Figure 5:
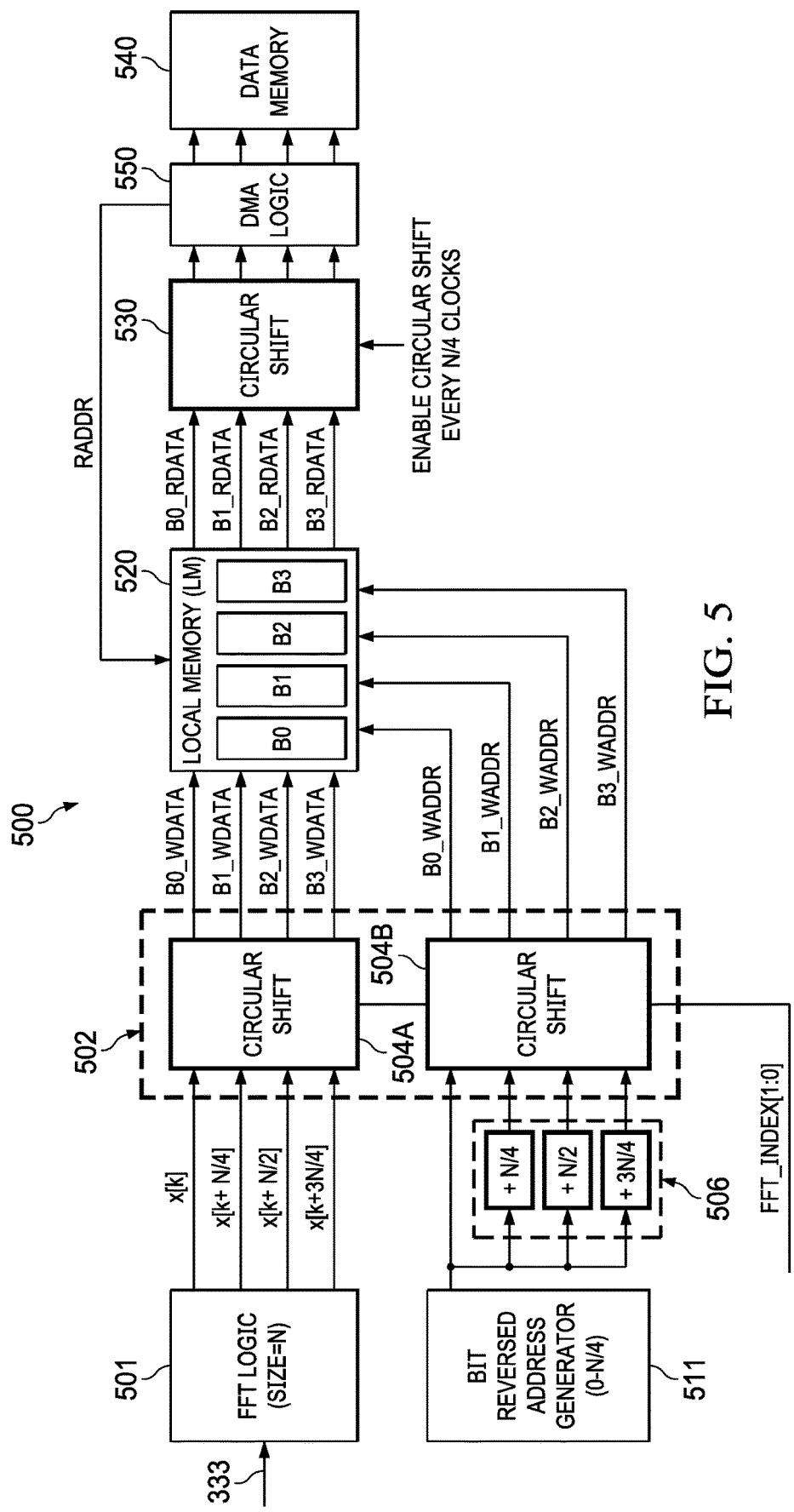
FIG. 5 is a block diagram showing an FFT engine in accordance with various examples.

FIG. 5 is a block diagram showing an FFT engine 500 in accordance with various examples. In some examples, the FFT engine 500 corresponds to the FFT engine 340 of FIG. 3 (used for radar data processing). In other examples, the FFT engine 500 is used for other sense signal analysis (e.g., image analysis), including multi-dimensional FFT operations. As shown in FIG. 5, the FFT engine 500 includes FFT logic 501, which provides K FFT output samples at a time, and N total FFT output samples for each digitized sense signal 333. In the example of FIG. 5, K=4 and N=16. In other examples, the FFT logic 501 varies with regard to the values of K and N, where K and N are integers, and where N is a multiple of K.

In some examples, the FFT engine topology 500 uses the FFT logic 501 to perform multi-dimensional FFT operations on a multi-dimensional array of size $(n_1, n_2, \ldots n_m)$ having m dimensions. In one example involving a 2D array, the FFT logic 501 executes a 1D FFT on $n_1$ rows of the input array, followed by a 1D FFT on $n_2$ columns of the first FFT output array. Also, in some real-time applications, where high throughput is desired, the FFT logic 501 is configured to process several samples of an input sequence in parallel and to provide multiple outputs in parallel. For example, if the FFT logic 501 is a 4X-FFT, 4 outputs are generated every cycle. To achieve a high-throughput FFT (e.g., 4X-FFT) for the FFT logic 501, different parallel pipelined FFT architectures are available and can be implemented in hardware.

Returning to FIG. 5, the FFT engine 500 also comprises a first memory device 520 with a plurality of banks (B0-B3). In some examples, the number of banks for the first memory device 520 equals K (the number of FFT output samples provided by the FFT logic 501 at a time), which is 4 in the example of FIG. 5. The FFT engine 500 also comprises a bit-reversed address generator 511, direct memory access (DMA) logic 550, and a second memory device 540. The FFT engine 500 also comprises a first set of circular shift components 502 and a second set of circular shift components 530.

In operation, the first set of circular shift components 502 are configured to perform shifts between banks of the first memory device 520 when writing FFT output samples in bit-reversed address order generated by the FFT logic 501 to the first memory device 520. More specifically, the first set of circular shift components 502 are configured to write FFT output samples corresponding to each digitized sense signal 333 across the plurality of banks of the first memory device 520. In some examples, the first set of circular shift components 502 include a set of write data multiplexers 504A coupled between the FFT logic 501 and the first memory device 520. The first set of circular shift components 502 also include a set of address multiplexers 504B coupled between the bit-reversed address generator 511 and the first memory device 520, where the set of write data multiplexers 504A and the set of address multiplexers 504B performs writes to B0-B3 with circular right shift of 1 bank based on a FFT index number (FFT_INDEX) or identifier that increments after the completion of an FFT operation in a particular dimension. In some examples, the FFT index number is a modulo X number, where X is the number of banks in the first memory. The FFT index number is reset to '0' at the start of a new dimension More specifically, the set of address multiplexers 504B are configured to use addresses from the bit-reversed address generator 511 to write FFT output samples for a given FFT operation to B0-B3 of the first memory device 520 before circularly shifting writes to store FFT output samples for another FFT operation in B0-B3 of the first memory device 520. In some examples, the set of write data multiplexers 504A and the set of address multiplexers 504B operate to write K FFT output samples at a time to B0-B3 of the first memory device 520. Also, in some examples, an FFT index number (FFT_index) is provided by a modulo K counter and is used to control operations of the set of write data multiplexers 504A and operations of the set of address multiplexers 504B. More specifically, in one example, the bit-reversed address generation module 511 generates an address between 0 and (N/K−1). In the example of FIG. 5, the bit-reversed address generation module 511 generates a number between 0 and 3. Based on the number generated by the bit-reversed address generation module 511 and the operations of address adjustment logic 506, the set of address multiplexers 504B generate K addresses, where the addresses are bit-reversed relative to the FFT output samples provided by the FFT logic 501 and are spaced apart by N/4 in the example of FIG. 5 (the address adjustment logic 506 provides spaced addresses as needed).

For the example of FIG. 5, the FFT logic 501 is represented as providing an array of FFT output samples X[k], X[k+N/4], X[k+2N/4], X[k+3N/4]. In some examples, k varies from 0-3 and N=16. In such case, the set of write data multiplexers 504A shifts the FFT output samples X[k], X[k+N/4], X[k+2N/4], X[k+3N/4], so that one of four available FFT output samples is stored in a different one of B0-B3. For instance, each FFT output sample X[k] is stored in bank B0, each FFT output sample X[k+N/4] is stored in bank B1, each FFT output sample X[k+2N/4] is stored in bank B2, and each FFT output sample X[k+3N/4] is stored in bank B3, where the value of k is 0, 1, 2, and 3 as a function of time. In the following FFT operations, the four FFT output data words are circularly shifted and each FFT output sample X[k] is stored in bank B1, each FFT output sample X[k+N/4] is stored in bank B2, each FFT output sample X[k+2N/4] is stored in bank B3, and each FFT output sample X[k+3N/4] is stored in bank B0, and so on Meanwhile, the second set of circular shift components 530 are configured to perform shift between banks of the first memory device 520 when reading FFT output samples in linear address order from the first memory device 520 for storage in the second memory device 540. More specifically, the second set of circular shift components 530 are configured to read FFT output samples from the first memory device 520 for storage in the second memory device 540 such that FFT output samples corresponding to each of the digitized sense signals 333 are read in sequential order from the plurality of banks of the first memory device 520. In some examples, the second set of circular shift components 530 include a set of read data multiplexers coupled between the first memory device 520 and the DMA logic 550 coupled to the second memory device 540. As an example, the read data multiplexers are configured to circularly shift reads of FFT output samples from one of B0-B3 of the first memory device 520 to another of B0-B3 at a predetermined rate equal to N/K read cycles to read FFT output samples corresponding to each digitized sense signal 333 in transposed order. For the FFT engine 500 of FIG. 5, at least some of the bit-reversal operations provided by the first set of circular shift components 502 and at least some of the memory transpose operations provided by the second set of circular shift components 530 are combined.

With the FFT engine 500, the second memory device 540 stores transposed FFT output samples in linear address order for multiple FFT outputs in any given dimension, where these FFT output samples are available for further FFT processing in another dimension or further analysis by the processor (see FIG. 4). In a radar data processing examples, the FFT output samples stored by the second memory device 540 are accessed by a processor (e.g., the processor 350) to determine object parameters such as object position, object velocity, and object angle relative to a radar origin.

With the FFT engine 500, the first set of circular shift components 502 are configured to write FFT output samples corresponding to each digital input signal across the plurality of banks (B0-B3) of the local memory 520 in bit-reversed address order. Also, the second set of circular shift components 530 are configured to read FFT output samples from the local memory 520 for storage in the data memory 540 such that FFT output samples corresponding to each of the digital input signals are read in linear order from the plurality of banks of the local memory 520. In some examples, the first set of circular shift components 502 include a set of write data multiplexers 504A coupled between the FFT logic 501 and the local memory 520. In some examples, the set of write data multiplexers 504A includes K write data multiplexers 504A configured to write each one of the K FFT output samples to one of the plurality of banks (B0-B3) of the local memory 520 before shifting to another of the plurality of banks of the first local memory 520 for the next FFT operation, where K is at least 2. More generically, the number of banks for the local memory 520 is equal to X, where X is at least equal to K. Also, in some examples, an index number is used to control shift operations of the first set of circular shift components 502, where the index number is incremented after each FFT operation and is a modulo X number. Also, in some examples, the first set of circular shift components 502 include a set of address multiplexers 504B coupled between the bit-reversed address generator 511 and the first memory device 520. In some examples, the set of address multiplexers 504B are configured to use K addresses from the bit-reversed address generator 511 to write to one of the plurality of banks (B0-B3) of the local memory 520 before shifting to another of the plurality of banks of the local memory 520 for the next FFT operation, where K is at least 2.

In some examples, the bit-reversed address generator 511 is configured to generate addresses from 0 to (N/4)−1 in bit-reversed order for one bank of the local memory 520. Also, the bit-reversed address generator 511 is configured to generate addresses for other banks of the local memory 520 by adding an address offset of N/K to a previous bank address, where N is the size of the FFT, and where K is the number of parallel inputs and outputs of the FFT logic 501.

In some examples, the second set of circular shift components 530 include a set of read data multiplexers coupled between the local memory 520 and DMA logic 550 coupled to the data memory 540. In some examples, read data multiplexers of the second set of circular shift components 530 are configured to shift reads of FFT output samples from one of the plurality of banks of the local memory 520 to another of the plurality of banks of the local memory 520 at a predetermined rate to read FFT output samples for each digital input signal in order. In some examples, read data multiplexers of the second set of circular shift components 530 are reconfigured at a predetermined rate equal to N/K read cycles, where N is the size of the FFT logic, and K is the number of parallel inputs and parallel outputs of the FFT logic 501.

In some examples, the local memory 520 has a capacity to store at least K FFT output array size (i.e., the total capacity of the local memory 520 will be equal to K×N times FFT output sample size) and has at least K banks. Also, the data memory 540 has a capacity that is greater than or equal to local memory 520, and where K is the number of parallel inputs and parallel outputs of the FFT logic 501. Also, in some examples, the DMA logic 550 is configured to transfer data from local memory 520 to the data memory 540 after the combined bit-reversal and transpose operations, and wherein the DMA logic 550 is also configured to transfer data from the data memory 540 to the FFT logic 501 to perform multi-dimensional FFT operations.

Figure 6A:
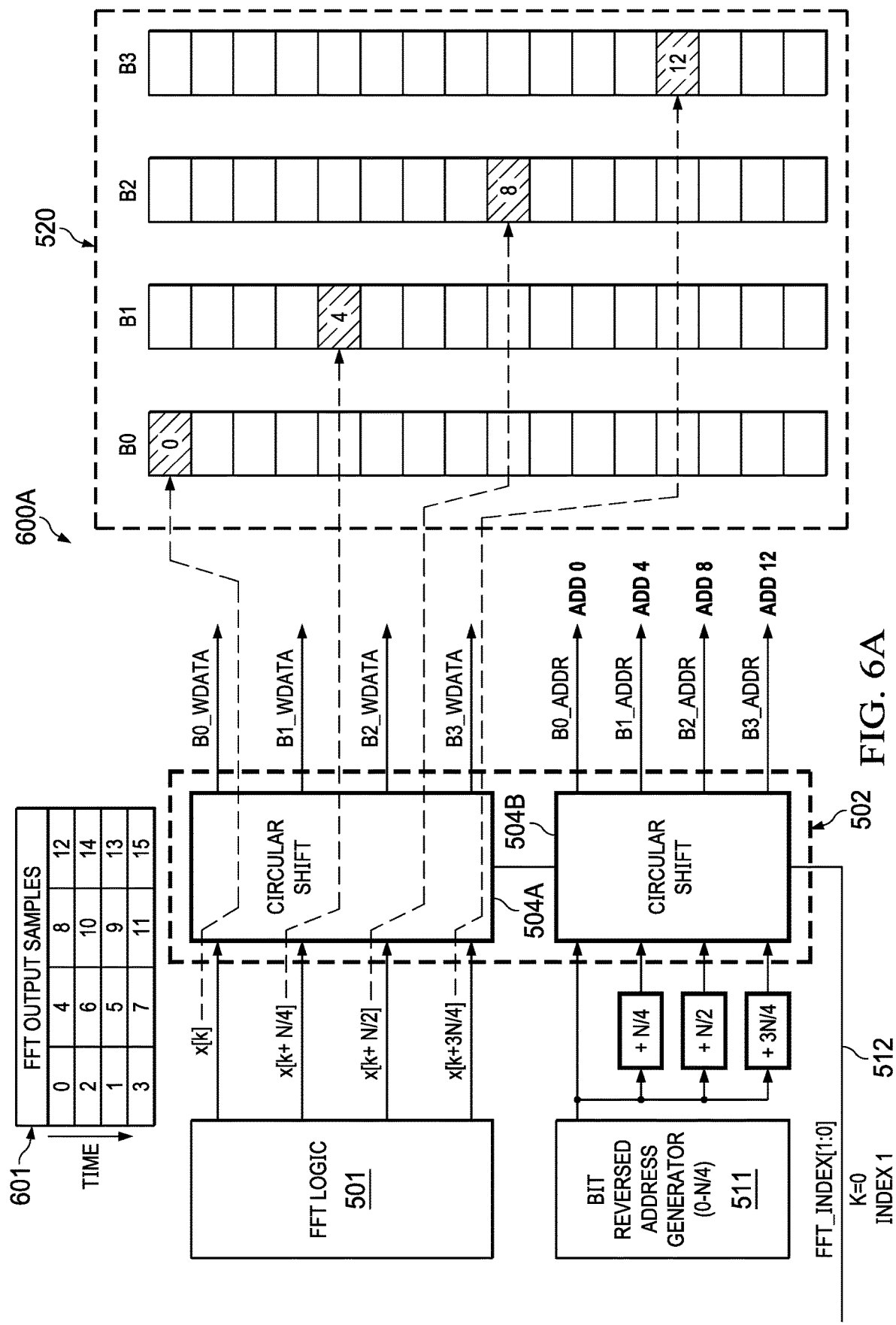
FIGS. 6A-6D are block diagrams showing example operations of the FFT engine of FIG. 5 in accordance with various examples.

FIGS. 6A-6D are a block diagrams illustrating example operations of the FFT engine 500 of FIG. 5 in accordance with various examples. In FIG. 6A, the represented operations 600A include writing some of a set of FFT output samples 601 for a first FFT to B0-B3 of the first memory device 520. More specifically, when FFT output samples with index values 0, 4, 8, 12 (k=0) are provided by the FFT logic 501 first, the first set of circular shift components 502 is used to write these FFT output samples to B0-B3 based on an identifier and/or FFT index number (FFT_index). For the represented operations 600A involving FFT output samples for a first FFT, the FFT output sample with index value 0 is written to the first row address of B0, the FFT output sample with index value 4 is written to the fifth row address of B1, the FFT output sample with index value 8 is written to the ninth row address of B2, and the FFT output sample with index value 12 is written to the thirteenth row address of B3.

Figure 6B:
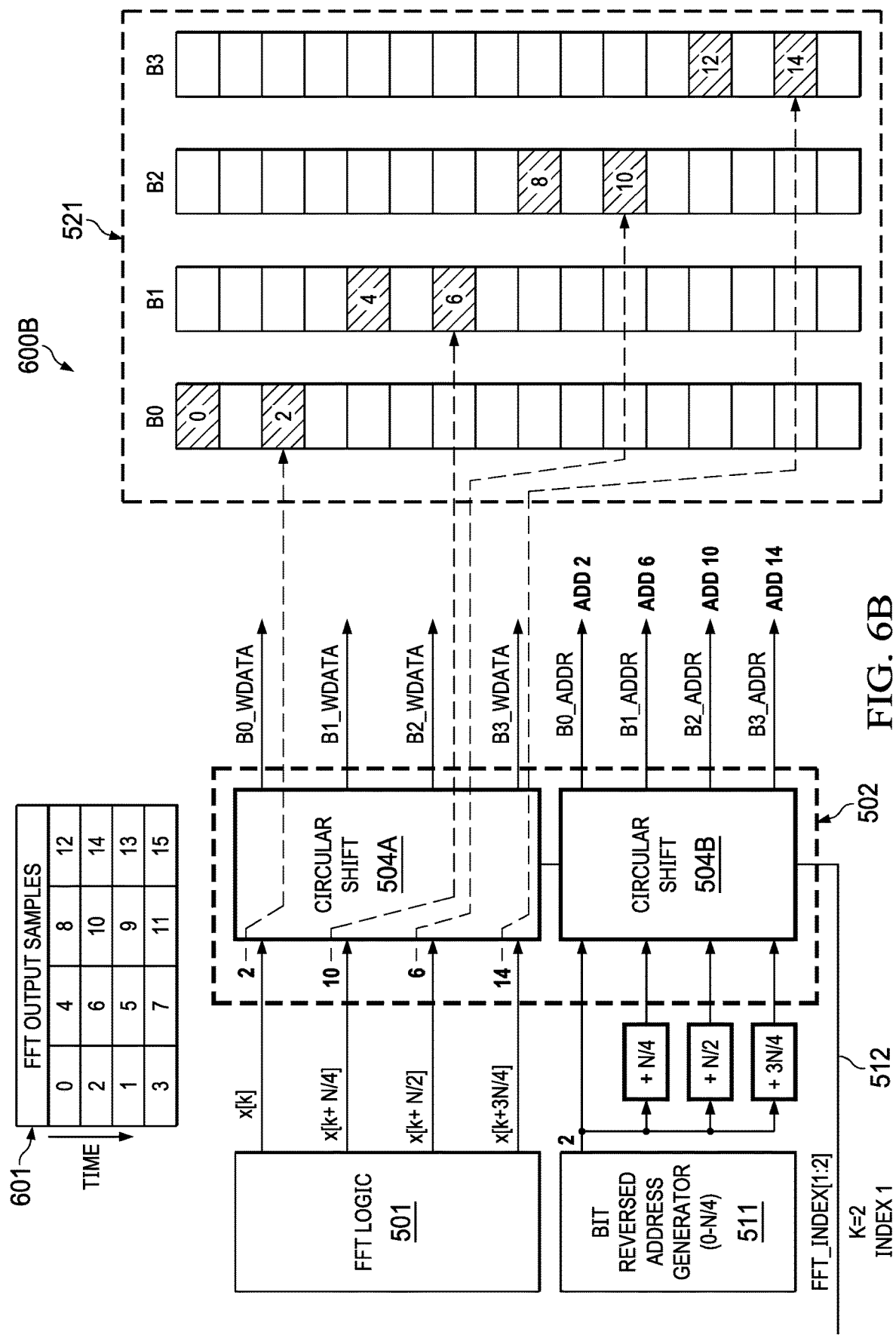

In FIG. 6B, the represented operations 600B include writing other FFT output samples from the second set of FFT output samples 601 for the first FFT to B0-B3 of the first memory device 520. More specifically, the FFT output samples with index values 2, 6, 10, 14 (k=2) are provided by the FFT logic 501 next, and the first set of circular shift components 502 is used to write these FFT output samples to B0-B3 based on an identifier and/or FFT index number (FFT_index). For the represented operations 600B involving FFT output samples for a first FFT, the FFT output sample with index value 2 is written to third row address of B0, the FFT output sample with index value 6 is written to the seventh row address of B1, the FFT output sample with index value 10 is written to the eleventh row address of B2, and the FFT output sample with index value 14 is written to the fifteenth row address of B3.

While not shown in FIG. 6B, the process of writing other FFT output samples from the set of FFT output samples 601 for the first FFT to B0-B3 of the first memory device 520 continues with k=1. More specifically, first set of circular shift components 502 is used to write the FFT output sample with the index value 1 to the second row address of B0, to write the FFT output sample with the index value 5 to the sixth row address of B1, to write the FFT output sample with the index value 9 to the tenth row address of B2, and to write the FFT output sample with the index value 13 to the fourteenth row address of B3. Thereafter, the process of writing other FFT output samples from the set of FFT output samples 601 for the first FFT to B0-B3 of the first memory device 520 continues with k=3. More specifically, the first set of circular shift components 502 is used to write the FFT output sample with the index value 3 to the fourth row address of B0, to write the FFT output sample with the index value 7 to the eighth row address of B1, to write the FFT output sample with the index value 11 to the twelfth row address of B2, to write the FFT output sample with the index value 15 to the sixteenth row address of B3.

Figure 6C:
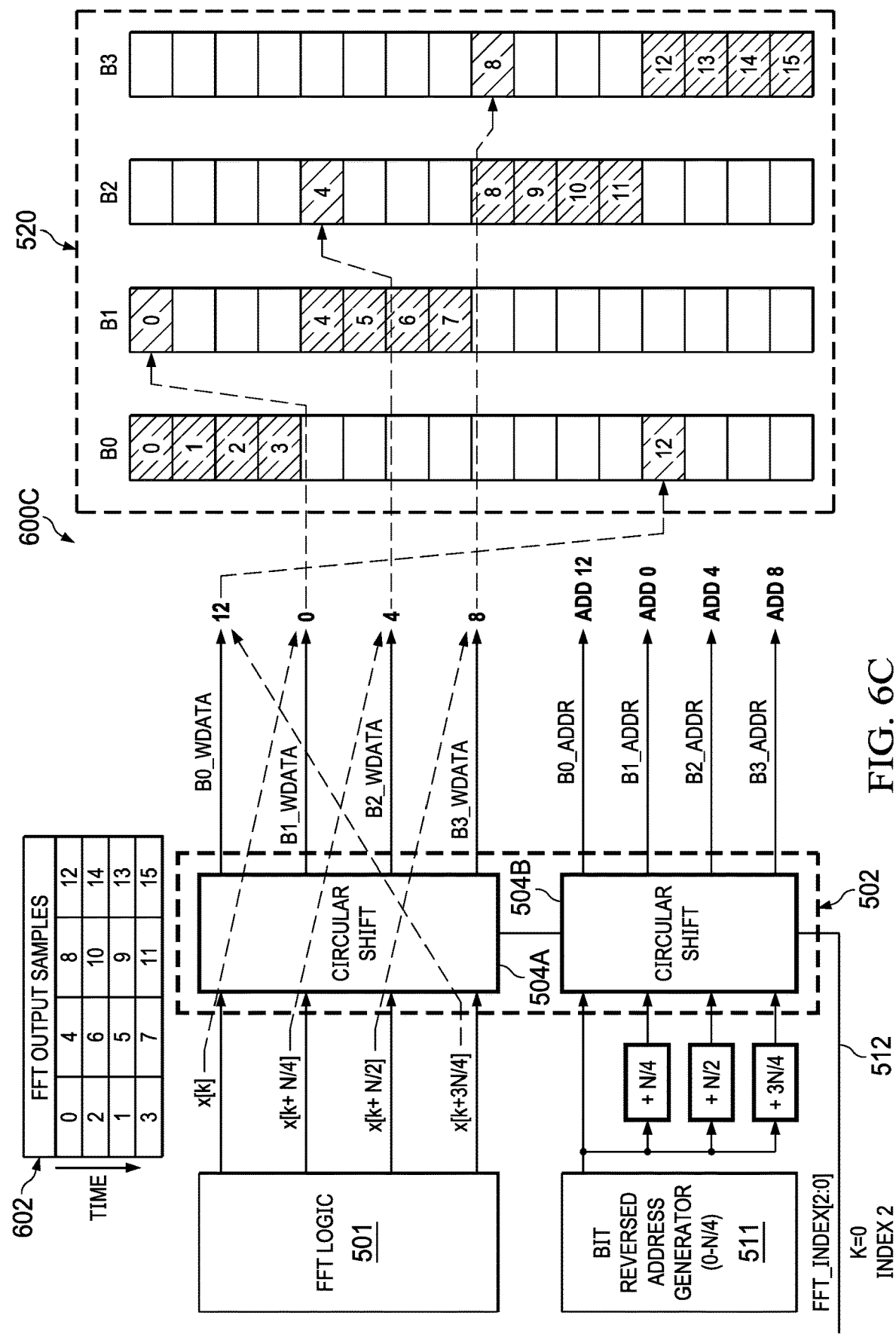

In FIG. 6C, the represented operations 600C include writing FFT output samples from a set of FFT output samples 602 for a second FFT to B0-B3 of the first memory device 520. More specifically, the FFT output samples with index values 0, 4, 8, 12 (k=0) are provided by the FFT logic 501 first, and the first set of circular shift components 502 is used to write these FFT output samples to B0-B3 based on an identifier and/or FFT index number (FFT_index). For the represented operations 600C, the first set of circular shift components 502 FFT is used to write the FFT output sample with index value 12 to the thirteenth row address of B0, to write the FFT output sample with index value 0 to the first row address of B1, to write the FFT output sample with index value 4 to the fifth row address of B2, and to write the FFT output sample with index value 8 to the ninth row address of B3.

While not shown in FIG. 6C, the process of writing other FFT output samples from second set of FFT output samples 602 for the second FFT to B0-B3 of the first memory device 520 continues with k=2. When k=2, the FFT output samples with index values 2, 6, 10, 14 are provided by the FFT logic 501, and the first set of circular shift components 502 is used to write these FFT output samples to B0-B3 based on an identifier and/or FFT index number (FFT_index). More specifically, the first set of circular shift components 502 is used to write the FFT output sample with index value 14 to the fifteenth row address of B0, to write the FFT output sample with index value 2 to the third row address of B1, to write the FFT output sample with index value 6 to the seventh row address of B2, and to write the FFT output sample with index value 10 is written to the eleventh row address of B3.

While not shown in FIG. 6C, the process of writing other FFT output samples from the third set of FFT output samples 602 for the second FFT to B0-B3 of the first memory device 520 continues with k=1. When k=1, the FFT output samples with index values 1, 5, 9, and 13 are provided by the FFT logic 501 and the first set of circular shift components 502 is used to write these FFT output samples to B0-B3 based on an identifier and/or FFT index number (FFT_index). More specifically, the first set of circular shift components 502 is used to write the FFT output sample with the index value 13 to the fourteenth row address of B0, to write the FFT output sample with the index value 1 to the second row address of B1, to write the FFT output sample with the index value 5 to the sixth row address of B2, and to write the FFT output sample with the index value 9 to the tenth row address of B3.

While not shown in FIG. 6C, the process of writing other FFT output samples from the fourth set of FFT output samples 602 for the second FFT to B0-B3 of the first memory device 520 continues with k=3. When k=3, the FFT output samples with index values 3, 7, 11, and 15 are provided by the FFT logic 501 and the first set of circular shift components 502 is used to write these FFT output samples to B0-B3 based on an identifier and/or FFT index number (FFT_index). More specifically, the first set of circular shift components 502 is used to write the FFT output sample with the index value 15 to the sixteenth row address of B0, to write the FFT output sample with the index value 3 to the fourth row address of B1, to write the FFT output sample with the index value 7 to the eighth row address of B2, and to write the FFT output sample with the index value 11 to the twelfth row address of B3.

While not shown in FIG. 6C, the process of writing other FFT output samples from other sets of FFT output samples 602 (e.g., for a third FFT and a fourth FFT) continues until B0-B3 are filled with the FFT output samples for four FFTs, where the FFT output samples are distributed across B0-B3.

Figure 6D:
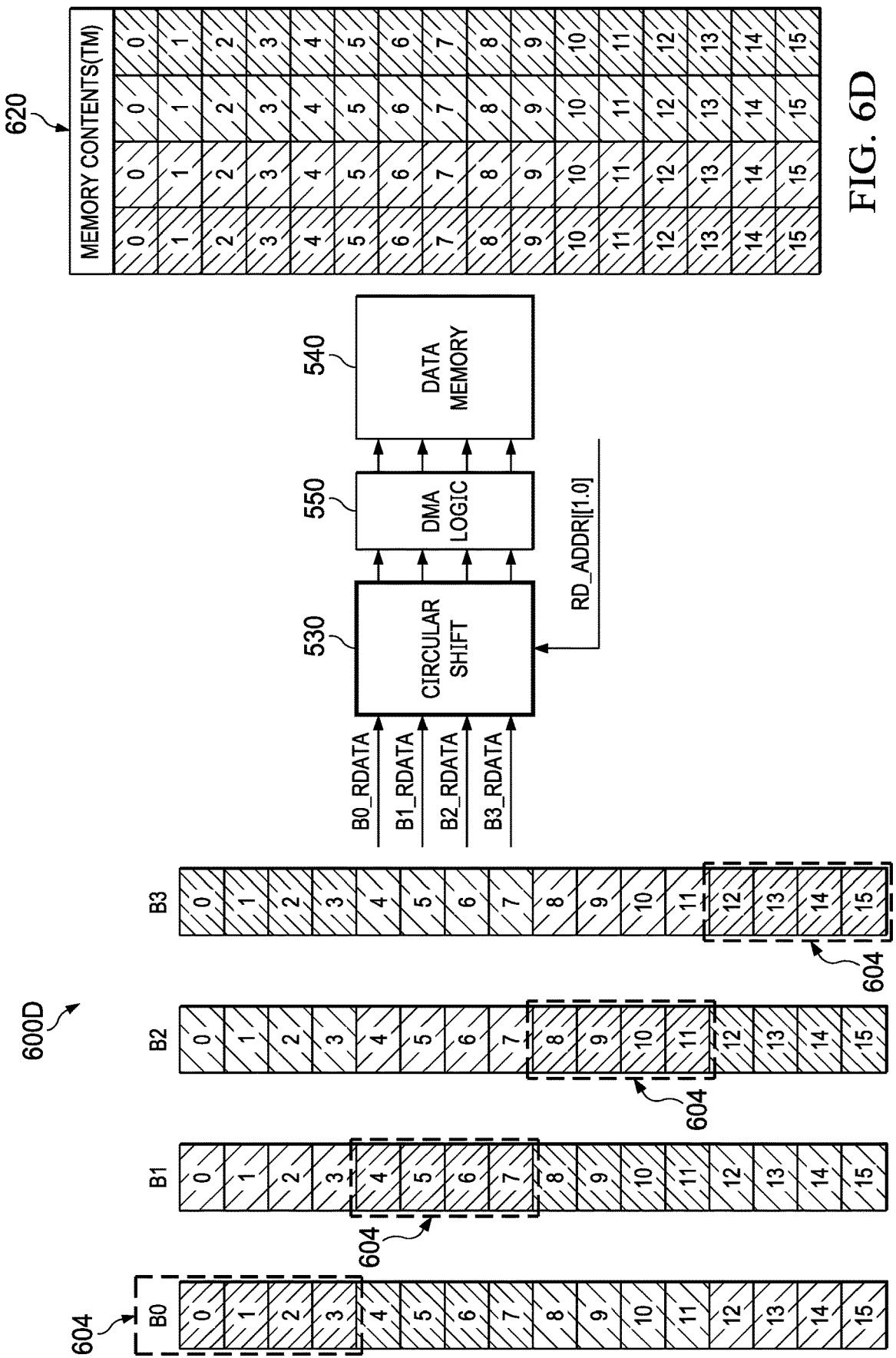

FIG. 6D shows represented operations 600D to read FFT output samples stored in B0-B3 for storage in the second memory device 540 using the second set of circular shift components 530 and DMA logic 550. As shown in FIG. 6D, the FFT output samples for four FFTs are distributed across B0-B3 such that same address location in all 4 banks contain the same FFT output index. Accordingly, read operations performed in linear order using the second set of circular shift components 530 shift left by 1 bank when reading the FFT output samples after every N/K read cycles More specifically, read operations 604 for FFT output samples involve reading the same memory addresses across B0, B1, B2, B3 in linear order. With the second set of circular left shift components 530, read operations to store FFT output samples from all 4 FFTs in the first memory into the second memory device 540 result in FFT output samples stored in the second memory device 540 having a memory transposed format 620.

Writing FFT outputs into the first memory device using a bit-reversed address and reading out in linear order before storing into the second device is performed to arrange the FFT outputs in linear order inside the second memory device. Along with this bit-reversal operation, the combination of first and second set of circular shift components also allows writing the FFT outputs across multiple FFTs in transpose order into the second memory device without incurring any additional latency for transpose operation In some examples, with the FFT engine 500, operations (e.g., the operations 600A, 600B, 600C, 600D represented in FIGS. 6A-6D) are repeated for consecutive K blocks of FFTs in one dimension, after which the FFT output samples are stored in a linear and transposed order in the second memory device 540. These transposed FFT outputs can then be accessed in linear order to perform the second set of FFT computations in the second dimension and so on. In a radar data processing examples, the final FFT output samples after multi-dimensional FFT computations are accessed by a processor (e.g., the processor 350) to determine object parameters such as object position, object velocity, and object angle relative to a radar origin.

Figure 7:
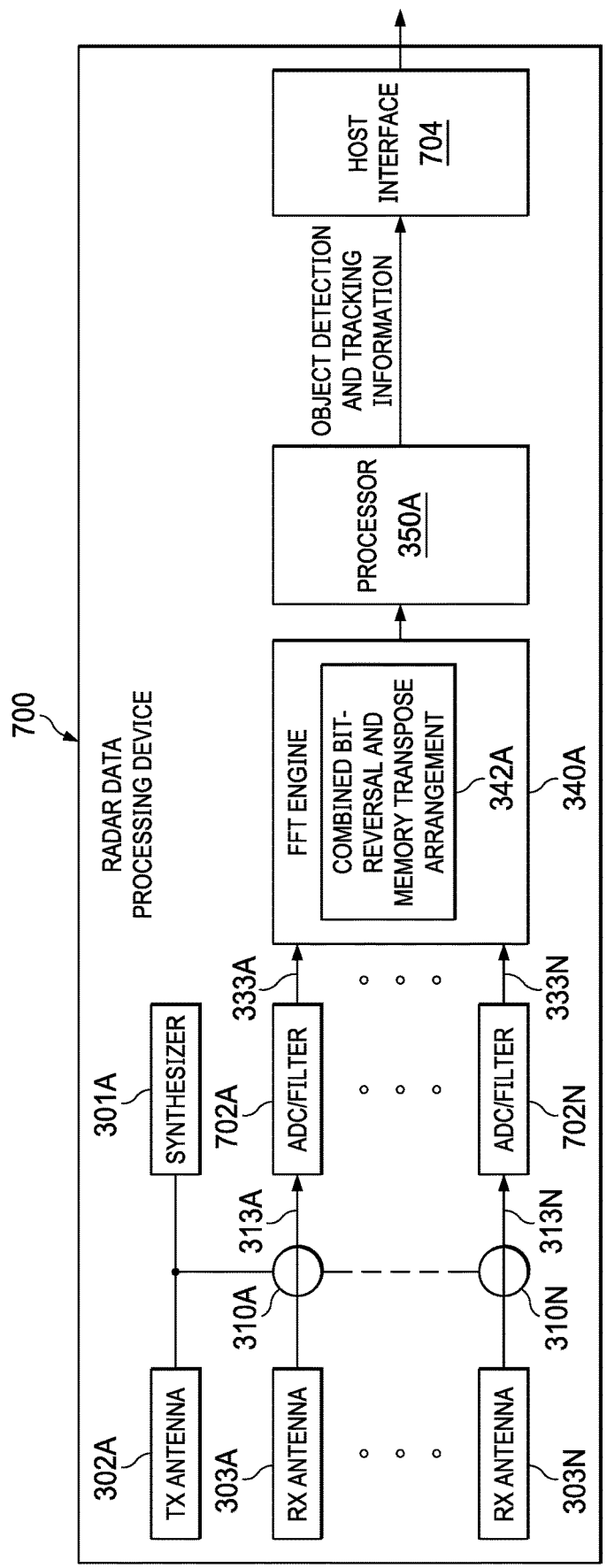
FIG. 7 is a block diagram of a radar data processor device in accordance with various examples.

FIG. 7 is a block diagram of a radar data processor device 700 in accordance with various examples. In different examples, the radar data processor device 700 corresponds to an integrated circuit, a multi-die module, a printed circuit board (PCB) with components, and/or other radar data processing device options. As shown, the radar data processor device 700 includes a synthesizer 301A (an example of the synthesizer 301 in FIG. 3), a transmitter antenna 302A (an example of the transmitter antenna 302 in FIG. 3), a plurality of receiver antennas 303A-303N (examples of the receiver antenna 303 in FIG. 3), and mixers 310A-310N (examples of the mixer 310 in FIG. 3). The output of the mixers 310A-310N are used as input signals 313A-313N (examples of the input signal 313) that include chirp and chirp reflection information. In some examples, the transmitter antenna 302A and/or the receiver antennas 303A-303N are separate from the other components represented for the radar data processor device 700 (e.g., the transmitter antenna 302A and/or the receiver antennas 303A-303N are on-chip or off-chip in different examples). Also, it should be appreciated that the receiver antennas 303A-303N are spaced from each other. Also, in some examples, the transmitter antenna 302A is usable as one of the receiver antennas 303A-303N and vice versa (with appropriate circuitry to connect/disconnect an antenna to other components as desired). At least one antenna is needed, with multiple antennas providing redundancy, angle information, and/or other radar system options.

The radar data processor device 700 also includes an ADC/filter 702A-702N for each of the input signals 313A-313N to filter and digitize the input signal 313A-313N. As shown, the radar data processor device 700 also includes an FFT engine 340A (an example of the FFT engine 340 in FIG. 3) configured to perform FFT operations as described herein for each of the digitized sense signal 333A-333N. With FFT output samples for different receiver antennas 303A-303N, object parameters are determined based on bit-reversed and memory transposed FFT output samples as described herein. More specifically, the FFT engine 340A includes a combined bit-reversal and memory transpose arrangement 342A (an example of the combined bit-reversal and memory transpose arrangement 342 in FIG. 3). In some examples, the combined bit-reversal and memory transpose arrangement 342A includes a first memory device with multiple banks (e.g., the first memory device 520 of FIG. 5), address generation logic (e.g., the address generation logic 506 of FIG. 5), circular shift components before and after the first memory device (e.g., the first and second set of circular shift components 502 and 530 of FIG. 5 to shift writes and reads according to a identifier or FFT index number), and a second memory device (e.g., the second memory device 540 in FIG. 5) to store FFT output samples after bit-reversal addressing and memory transpose operations. In other examples, an FFT engine, such as the FFT engine 340 (having combined transpose and bit reversal re-ordering), can also be sold as a standalone FFT engine (e.g., in a digital only chip) and/or can be combined with other components.

Figure 8:
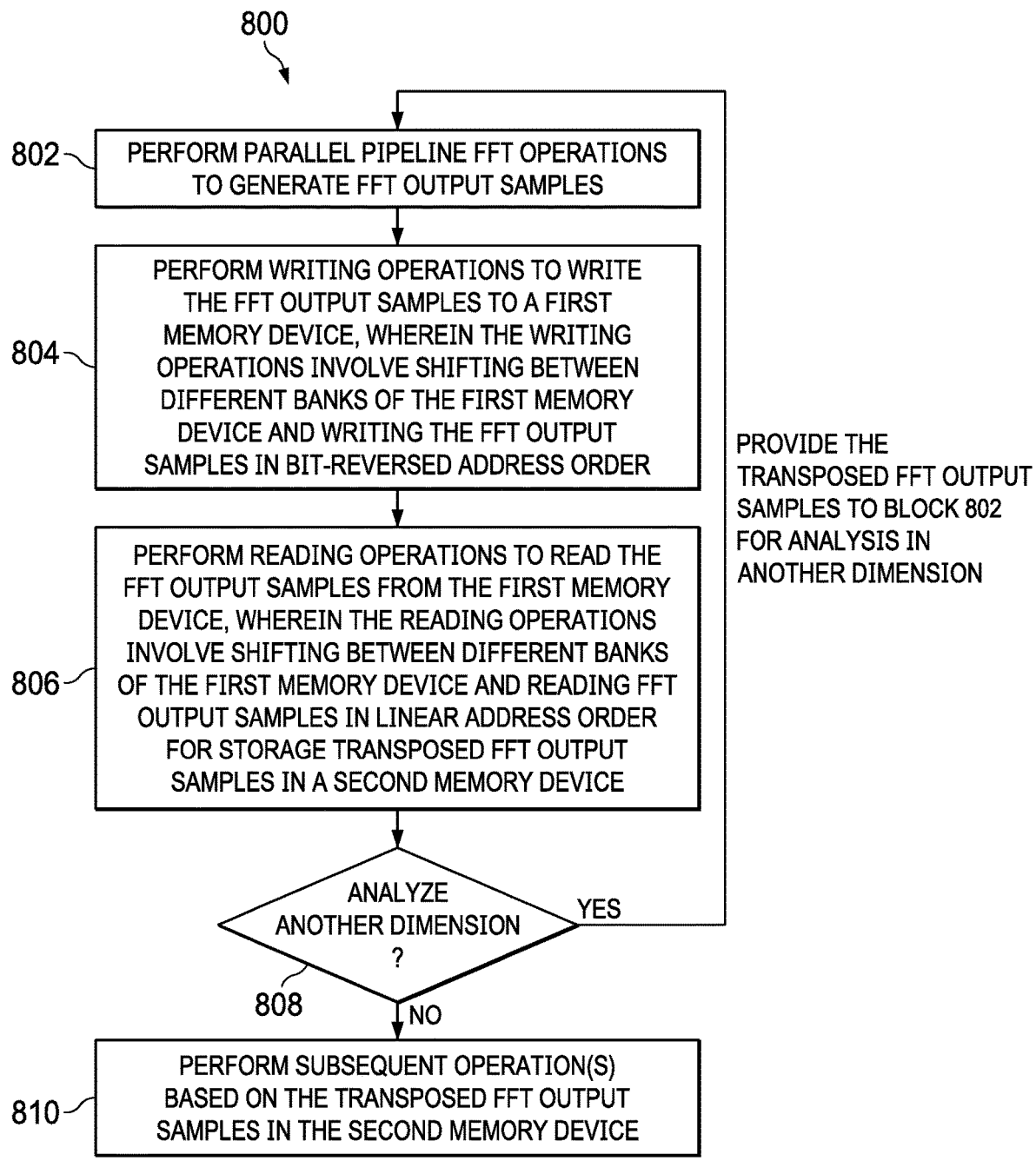
FIG. 8 is a flowchart showing an FFT engine method in accordance with various examples.

FIG. 8 is a flowchart showing an FFT engine method 800 in accordance with various examples. As shown, the method 800 comprises performing parallel pipeline FFT operations to generate FFT output samples at block 802. At block 804, writing operations are performed to write the FFT output samples to a first memory device, wherein the writing operations involve shifting between different banks of the first memory device and writing the FFT output samples in bit-reversed address order. At block 806, reading operations are performed to read the FFT output samples from the first memory device, wherein the reading operations involve shifting between different banks of the first memory device and reading FFT output samples in linear address order for storage of transposed FFT output samples in a second memory device. If another dimension is to be analyzed (determination block 808), the transposed FFT output samples are provided to block 802 for analysis in another dimension. In some examples, multi-dimensional analysis involves use of DMA logic to convey transposed FFT output samples to FFT logic associated with block 802. If another dimension is not to be analyzed (determination block 808), the transposed FFT output samples on the second memory device are used to perform at least one subsequent operation at block 810.

In some examples, the method 800 is used to analyze sense signals (e.g., a radar chirp and radar chirp reflections, or image data) in one or more dimensions. In some examples, the method 800 also including receiving a sense signal, wherein the performing parallel pipeline FFT operations generates FFT output samples related to the sense signal. In such case, the transposed FFT output samples provided at block 806 are used to analyze an object associated with the sense signal. In some examples, the sense signal to be analyzed in or more dimensions includes radar chirp and radar chirp reflection information. In some examples, a processor is able to use transposed FFT output samples for one or more dimensions to detect object parameters such as object position relative to a radar system position, object speed relative to the radar system position, and/or object angle relative to a radar system position Certain terms have been used throughout this description and claims to refer to particular system components. As one skilled in the art will appreciate, different parties may refer to a component by different names. This document does not intend to distinguish between components that differ in name but not function. In this disclosure and claims, the terms "including" and "comprising" are used in an open-ended fashion, and thus should be interpreted to mean "including, but not limited to . . . ." Also, the term "couple" or "couples" is intended to mean either an indirect or direct wired or wireless connection. Thus, if a first device couples to a second device, that connection may be through a direct connection or through an indirect connection via other devices and connections. The recitation "based on" is intended to mean "based at least in part on." Therefore, if X is based on Y, X may be a function of Y and any number of other factors.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A data processing device that comprises:
Fast Fourier Transform (FFT) logic configured to generate FFT output samples for each of a plurality of digital input signals;
a first memory device with a plurality of banks;
a second memory device;
a bit-reversed address generator configured to provide a bit-reversed address order;
a first set of circular shift components coupled to the bit-reversed address generator and configured to shift between the plurality of banks when writing the generated FFT output samples in the bit-reversed address order to the first memory device; and
a second set of circular shift components configured to shift between the plurality of banks when reading FFT output samples in linear address order from the first memory device for storage in the second memory device, wherein the first and second set of circular shift components together are configured to read FFT output samples in transpose order using combined bit-reversal and memory transpose operations.

2. The data processing device of claim 1, wherein the first set of circular shift components are configured to write FFT output samples corresponding to each digital input signal across the plurality of banks of the first memory device in bit-reversed address order.

3. The data processing device of claim 2, wherein the second set of circular shift components are configured to read FFT output samples from the first memory device for storage in the second memory device such that FFT output samples corresponding to each of the digital input signals are read in linear order from the plurality of banks of the first memory device.

4. The data processing device of claim 1, wherein the first set of circular shift components include a set of data multiplexers coupled between the FFT logic and the first memory device.

5. The data processing device of claim 4, wherein the set of data multiplexers is a set of K data multiplexers configured to write each one of K FFT output samples to one of X banks of the first memory device before shifting to another of X banks of the first memory device for a next FFT operation, wherein X is at least equal to K, and wherein K is at least 2.

6. The data processing device of claim 1, wherein an index number is used to control shift operations of the first set of circular shift components, and wherein the index number is incremented after each FFT operation and is a modulo X number.

7. The data processing device of claim 1, wherein the first set of circular shift components include a set of address multiplexers coupled between the bit-reversed address generator and the first memory device.

8. The data processing device of claim 7, wherein the set of address multiplexers are configured to use K addresses from the bit-reversed address generator to write to one of the plurality of banks of the first memory device before shifting to another of the plurality of banks of the first memory device for a next FFT operation, and wherein K is at least 2.

9. The data processing device of claim 7, wherein the bit-reversed address generator is configured to generate addresses from 0 to N/4-1 in bit-reversed order for one bank of the first memory device, and wherein the bit-reversed address generator is configured to generate addresses for other banks of the first memory device by adding an address offset of N/K to a previous bank address, where N is the size of the FFT, and where K is the number of parallel inputs and outputs of the FFT logic.

10. The data processing device of claim 1, wherein the second set of circular shift components include a set of read data multiplexers coupled between the first memory device and direct memory access (DMA) logic coupled to the second memory device.

11. The data processing device of claim 10, wherein the set of read data multiplexers are configured to shift reads of FFT output samples from one of the plurality of banks of the first memory device to another of the plurality of banks of the first memory device at a predetermined rate to read FFT output samples for each digital input signal in order.

12. The data processing device of claim 11, wherein the set of read data multiplexers are reconfigured at a predetermined rate equal to N/K read cycles, where N is the size of the FFT logic, and K is the number of parallel inputs and parallel outputs of the FFT logic.

13. The data processing device of claim 1, wherein the first memory device has a capacity to store at least K FFT output size and has at least K banks, and wherein the second memory device has a capacity that is greater than or equal to first memory device, and where K is the number of parallel inputs and parallel outputs of the FFT logic.

14. The data processing device of claim 1, wherein the data processing device further comprising image processing components, and wherein the data processing device performs multi-dimensional FFT operations of a multi-dimensional array.

15. The data processing device of claim 1, wherein the data processing device is a stand-alone FFT engine.

16. The data processing device of claim 1, further comprising direct memory access (DMA) logic configured to transfer data from the first memory device to the second memory after the combined bit-reversal and transpose operations, and wherein the DMA logic is also configured to transfer data from the second memory device to the FFT logic to perform multi-dimensional FFT operations.

17. An integrated circuit that comprises:
Fast Fourier Transform (FFT) logic configured to generate K FFT output samples at a time and N total FFT output samples for each of the plurality of digitized sense signals, wherein N is a multiple of K, and wherein K is an integer equal to at least 2;
a bit-reversed address generator configured to provide a bit-reversed address order;
a first set of circular shift components coupled to the bit-reversed address generator and configured to provide shifts when writing the N FFT output samples in the bit-reversed address order in a first memory device with K banks; and
a second set of circular shift components configured to perform shifts when reading the N FFT output samples in linear address order from a first memory device for storage in a second memory device, wherein the first and second set of circular shift components together are used to read FFT output samples in transpose order, and wherein at least some bit-reversal operations and some memory transpose operations are combined.

18. The integrated circuit of claim 17, wherein the first set of circular shift components is configured to write the N FFT output samples for each of the plurality of digitized sense signals across the K banks so that each of the K banks stores some of the N FFT output samples for each of the plurality of digitized sense signals.

19. The integrated circuit of claim 17 wherein the second set of circular shift components are configured to read FFT output samples from the first memory device for storage in the second memory device such that FFT output samples corresponding to each of the digitized sense signals are read in sequential order from the K banks of the first memory device.

20. The integrated circuit of claim 17, wherein the first set of circular shift components include a set of write data multiplexers coupled between the FFT logic and a first memory device, wherein the set of write data multiplexers are configured to write the K FFT output samples to one of the K banks of the first memory device before shifting writes to another of the K banks of the first memory device.

21. The integrated circuit of claim 17, wherein the first set of circular shift components include a set of address multiplexers coupled between the bit-reversed address generator and the first memory device, wherein the set of address multiplexers are configured to use K addresses from the bit-reversed address generator to write to one of the plurality of banks of the first memory device before shifting to another of the plurality of banks of the first memory device.

22. The integrated circuit of claim 17, wherein the second set of circular shift components include a set of read data multiplexers coupled between the first memory device and direct memory access (DMA) logic coupled to the second memory device, wherein the read data multiplexers are configured to shift reads of FFT output samples from one of the K banks of the first memory device to another of the K banks of the first memory device at a predetermined rate to read FFT output samples for each digitized sense signal in order.

23. The integrated circuit of claim 17, further comprising a processor configured to use bit-reversed and memory transposed FFT output samples stored in the second memory device to determine at least one of an object range, an object velocity, and an object angle relative to a chirp origin.

* * * * *